US007175773B1

(12) United States Patent
Heidemann et al.

(10) Patent No.: US 7,175,773 B1
(45) Date of Patent: Feb. 13, 2007

(54) METHOD FOR MANUFACTURING A BLAZED GRATING, SUCH A BLAZED GRATING AND A SPECTROMETER HAVING SUCH A BLAZED GRATING

(75) Inventors: Klaus Heidemann, Oberkochen (DE); Holger Kierey, Aalen (DE); Bruno Nelles, Oberkochen (DE)

(73) Assignee: Carl Zeiss Laser Optics GmbH (DE)

( * ) Notice: Subject to any disclaimer, the term of this patent is extended or adjusted under 35 U.S.C. 154(b) by 72 days.

(21) Appl. No.: 10/866,957

(22) Filed: Jun. 14, 2004

(51) Int. Cl.
   *B29D 11/00* (2006.01)
(52) U.S. Cl. ..................................................... 216/24
(58) Field of Classification Search ................ 216/24, 216/26; 359/563
   See application file for complete search history.

(56) References Cited

U.S. PATENT DOCUMENTS

| 3,656,951 A * | 4/1972 | Anderson et al. ......... 430/281.1 |
| 2004/0179564 A1 * | 9/2004 | Maul et al. .................... 372/43 |

FOREIGN PATENT DOCUMENTS

| EP | 0 336 461 B1 | 11/1989 |
| JP | 30 14 597 C2 | 10/1981 |
| JP | 57081214 | 5/1982 |
| JP | 62042103 | 2/1987 |
| JP | 63187202 | 2/1988 |
| JP | 63085702 | 4/1988 |
| JP | 02251904 | 9/1990 |
| JP | 03157603 | 7/1991 |
| JP | 04263203 | 9/1992 |
| JP | 04324401 | 11/1992 |
| JP | 07104112 | 4/1995 |
| JP | 08082551 | 3/1996 |
| JP | 12105307 | 4/2000 |

OTHER PUBLICATIONS

Dr. K.F. Heidemann, Ionenätzverfahren für Anwendungen in der Optik, pp. 153-161.
Karlfried Osterried et al., Groove profile modification of blazed gratings by dip coating with hardenable liquids, Applied Optics, vol. 37, No. 34, Dec. 1, 1998, pp. 8002-8007.
B. Nelles et al., Design, manufacturing and testing of gratings for synchrotron radiation, Nuclear Instruments and Methods in Physics Research, 2001, pp. 260-266.

* cited by examiner

*Primary Examiner*—Parviz Hassanzadeh
*Assistant Examiner*—Roberts Culbert
(74) *Attorney, Agent, or Firm*—St. Onge Steward Johnston & Reens LLC

(57) ABSTRACT

In a method for manufacturing a blazed grating from a prefabricated initial blazed grating, a blazed grating the substrate of a first material of which has a surface, which has an initial surface profile having an initial blaze angle, is provided. An auxiliary layer of a second material is applied onto the surface of the substrate, wherein the second material is different from the first material. The auxiliary layer is removed at least partially by means of etching, wherein the etching is carried out at least until the etching simultaneously acts on the auxiliary layer and on the initial surface profile of the substrate. A ratio between an etching rate for the auxiliary layer and an etching rate for the substrate is adjusted such that the initial blaze angle is reduced to a final blaze angle. Further, a blazed grating manufactured in that way and an optical device having such a blazed grating, are described.

28 Claims, 5 Drawing Sheets

METHOD FOR MANUFACTURING A BLAZED GRATING, SUCH A BLAZED GRATING AND A SPECTROMETER HAVING SUCH A BLAZED GRATING

The invention relates to a method for manufacturing a blazed grating. More specifically, the invention relates to a method for manufacturing a blazed grating having a small blaze angle for use in an optical device, in particular a spectrometer or a monochromator at wavelengths extending from the far infrared to soft x-ray range.

The invention further relates to such a blazed grating and such an optical device which are particularly suited for use in semiconductor lithography equipment in the extreme ultraviolet (EUV) spectral range.

Blazed gratings are a kind of diffraction gratings the surface profile of which has a multiplicity of grooves which form, in cross-section, a saw tooth pattern.

In general, if monochromatic light strikes a grating then a fraction of it is diffracted into each diffraction order. The fraction diffracted into any order can be termed the efficiency of the grating in that order. Blazed gratings are usually designed for efficient diffraction into the first order. The efficiency can be tuned by changing the groove facet angles which are referred to as blaze angles. The blaze angle is the angle of inclination of the long flank of a facet of the saw tooth pattern with respect to the base area of the facet. The optimization of efficiency by appropriate groove shaping has become known as blazing. The blaze wavelength is the wavelength for which the grating is most efficient. The blaze angle is determined by the wavelength $\lambda$ for which the diffraction efficiency in the first diffraction order is to be maximum for a given groove density.

For applications of such blaze gratings in the DUV and EUV spectral range of wavelengths, the blaze angle of the blazed grating has to be very small. For example, for a wavelength $\lambda=13.5$ nm and a groove density of 1000 l/mm, the required blaze angle is about 1.2°. On the other hand, for a wavelength in the IR range of about 2 µm and a groove density of 25 l/mm a blaze angle of 1.4° is necessary.

The manufacturing methods heretofore known are not able to obtain blazed gratings with such small blaze angles and yet a high diffraction efficiency which renders the blazed grating suited for use for example in semiconductor lithography equipment or in soft x-ray astronomy.

Several manufacturing methods are known heretofore to manufacture a blazed grating.

Blazed gratings can be manufactured by means of mechanical ruling. A gold layer is deposited on the substrate, and the grooves are ruled in the gold layer. The blaze angle produced in that way can be further reduced up to the factor 4.5 when in a subsequent ion beam etching process the grooves are transferred from the gold layer in the surface of the substrate. However, with this method the apex angle of each blaze facet is increased whereby the grating efficiency decreases in case of almost normal incidence of light. Another drawback of this known method is that the mechanical ruling of blazed gratings having small blaze angles is restricted to plane gratings. It is not suited for strongly curved gratings.

Curved gratings can be manufactured by holographic techniques.

In the holographic technique, the substrate is coated with a photoresist layer which is subsequently holographically exposed by two light waves, that are incident from different sides of the photoresist layer. The blazed groove profiles produced in such way disadvantageously have rounded upper and lower edges which result in a reduction of the blaze efficiency with increasing density of grooves.

Subsequent to the development of the photoresist layer the grooves are transferred into the substrate surface by means of an ion beam etching process, thereby reducing the inclination of the groove profile according to the ratio between the etching rates for the photoresist layer and the substrate resulting in a reduced blaze angle and, accordingly, a smaller blaze wavelength.

However, the drawback of the holographic technique is that the substrate has to be transparent, because when exposing the photoresist, one light wave must be irradiated onto the photoresist layer through the substrate. A further drawback of this known holographic technique is that it requires a considerable additional costs for additional optical elements which are required to correct wave front distorsions of the light wave entering into the substrate in order to produce the desired groove pattern.

Another known method for manufacturing a blazed grating consists in ion beam blazing of a holographic grating. The substrate is coated with a photoresist layer which is exposed holographically by two light waves impinging on the photoresist layer from the air side. The grooves are developed with an almost symmetric profile such that stripes are exposed between the photoresist barriers. In a subsequent ion beam etching process the symmetric groove profile is transferred into the substrate surface, wherein the ion beam is incident onto the surface with a fixed angle to the grating area, thereby producing two facets which are oriented perpendicular to the ion beam direction of the maximum and minimum etching rate. The developing blazed grating has a blaze angle which approximately corresponds to the angle of incidence of the ion beam. The blaze efficiency obtainable by this method is limited due to the large apex angle of about 130° instead of an ideal angle of 90° for a maximum blaze efficiency. It has been shown that in case of blaze angles smaller than about 6° the blaze efficiency at normal incidence of light is additionally decreased by increasing curvature of the blaze facets.

It is further known to reduce the blaze angle of a blazed grating by coating the grating with a curable liquid. The groove profile is increasingly flattened when the thickness of the layer coated on the substrate increases because of the viscosity and the surface tension of the liquid. It is possible to reduce the blaze angle by a factor of about 5 with this method, however, the upper and lower profile edges are more and more rounded as the blaze angle decreases, whereby the blaze efficiency decreases, accordingly.

In order to summarize the foregoing, the methods for manufacturing a blazed grating from a substrate which are known heretofore are not readily satisfying when blazed gratings having very small blaze angles and nevertheless a high blaze efficiency are to be manufactured.

SUMMARY OF THE INVENTION

It is an object of the invention to provide a method for manufacturing a blazed grating which renders it possible to manufacture a blazed grating having a small and definite blaze angle and nevertheless a high blaze efficiency.

It is another object of the invention to provide a method for manufacturing a blazed grating without the substrate being restricted to transparent materials.

It is another object of the present invention to provide a method for manufacturing a blazed grating without the blazed grating being restricted to a planar grating, i.e. the blazed grating can have a curved base structure.

It is another object of the invention to provide a blazed grating having a small and definite blaze angle and nevertheless a high blaze efficiency.

It is another object of the present invention to provide an optical device having such a blazed grating.

According to an aspect of the present invention, a method for manufacturing a blazed grating from a prefabricated initial blazed grating, comprising a substrate is provided. The substrate is made of a first material and has a surface which has an initial surface profile having an initial blazed angle. An auxiliary layer of a second material is applied onto the surface of the substrate, wherein the second material is different from the first material. Next, the auxiliary layer is removed at least partially by means of etching, wherein the etching is carried out at least until the etching simultaneously acts on the auxiliary layer and on the initial surface profile of the substrate. The etching is carried out in that way, that a ratio between an etching rate for the auxiliary layer and an etching rate for the substrate are adjusted such that the initial blaze angle is reduced to a final blaze angle.

By virtue of the present invention, a blazed grating can be obtained having very small blaze angle and yet still a high blaze efficiency.

According to another aspect of the invention, a blazed grating is provided, comprising a substrate having a surface which has a surface profile having a blaze angle smaller than about 2.5° with a blaze efficiency larger than about 60%. In particular, the blazed grating has a blaze angle of about 1.2° with a blaze efficiency larger than about 75% at a wavelength of about 13.5 nm.

Further, an optical device, in particular spectrometer or monochromator is provided according to the invention, which comprises at least one blazed grating as mentioned before.

BRIEF DESCRIPTION OF THE DRAWINGS

Further features and advantages will become more apparent from the following description given with reference to the accompanying drawings, in which preferred embodiments of the present invention are illustrated. In the drawings.

DETAILED DESCRIPTION OF PREFERRED EMBODIMENTS

In the following, a blazed grating according to the principles of the present invention, an optical device having such a blazed grating and a method for manufacturing such a blazed grating according to the invention are described in more detail.

Figure 1:
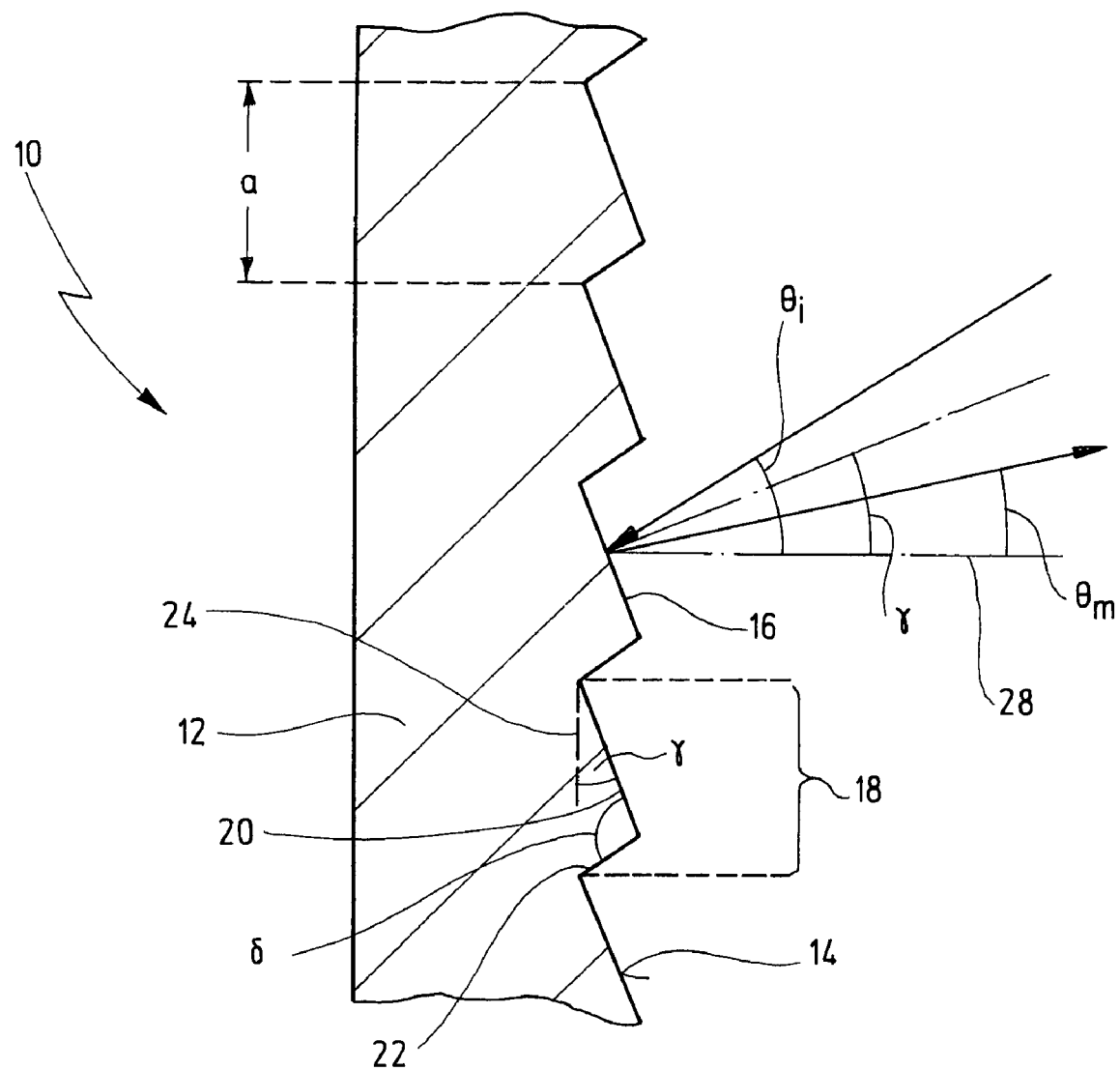
FIG. 1 shows a schematic representation of a portion of a blazed grating in enlarged scale.

FIG. 1 generally shows a blazed grating labelled with general reference numeral 10. The blazed grating 10 is a diffraction grating.

The blazed grating 10 comprises a substrate 12 of a first material which can be any suitable material transparent to light in the spectral range of interest, for example in the ultraviolet spectral range. However, the substrate 12 can also be made from a material which is opaque to light in the spectral range of interest, if the blazed grating 10 is used as a reflective grating. For example, substrate 12 can be made of a material chosen from the group comprising glass, silica glass, silicon, silicon carbide, calcium fluoride, magnesium fluoride, nickel, gold or other suitable materials. While materials can be used which are reflective without an additional coating, other non-reflective or reflective materials can be used, and the manufactured grating is subsequently coated with a reflective coating like gold or platinum.

The substrate 12 has a surface 14 which has a surface profile 16 which is, in cross-section, a saw tooth pattern. The surface profile 16 is a periodic arrangement of grooves 18 having a groove spacing a. Each groove 18 has two facets 20 and 22, the blaze facet 20 being longer than the anti-blaze facet 22.

The blaze angle γ is defined as the angle between the blaze facet 20 and the grating base line 24.

The apex angle δ is defined as the angle between the blaze facet 20 and the anti-blaze facet 22.

In general, for a diffraction grating the following grating equation holds:

$$\sin\Theta_i + \sin\Theta_m = m\lambda/a,$$

where m is an integer and indicates the order of diffraction, and $\Theta_i$ is the angle of incidence with respect to the grating normal 28, and wherein $\Theta_m$ is the angle of diffractive light in m-th order with respect to the grating normal 28. Typically, a blazed grating is designed for most efficient diffraction into the first order. The blaze wavelength is the wavelength for which the grating 10 is most efficient, and which is dominated by the blaze angle γ.

The blazed grating 10 has a blaze angle γ that is smaller than about 2.5° with a blaze efficiency larger than about 60%. Preferably, the blazed grating 10 has a blaze angle γ which is about 1.2° with a blaze efficiency larger than about 60% at a wavelength of about 13.5 nm. Still more preferably, the blazed grating 10 has a blaze angle γ which is about 1.2° with a blaze efficiency larger than about 75% at a wavelength of about 13.5 nm. Preferably, the apex angle δ is about 900.

While blazed grating 10 is a blazed plane grating, the present invention is also applicable to a type of blazed gratings, which are curved, i.e. the surface 14 and the surface profile 16 lie in a curved surface.

Figure 1A:
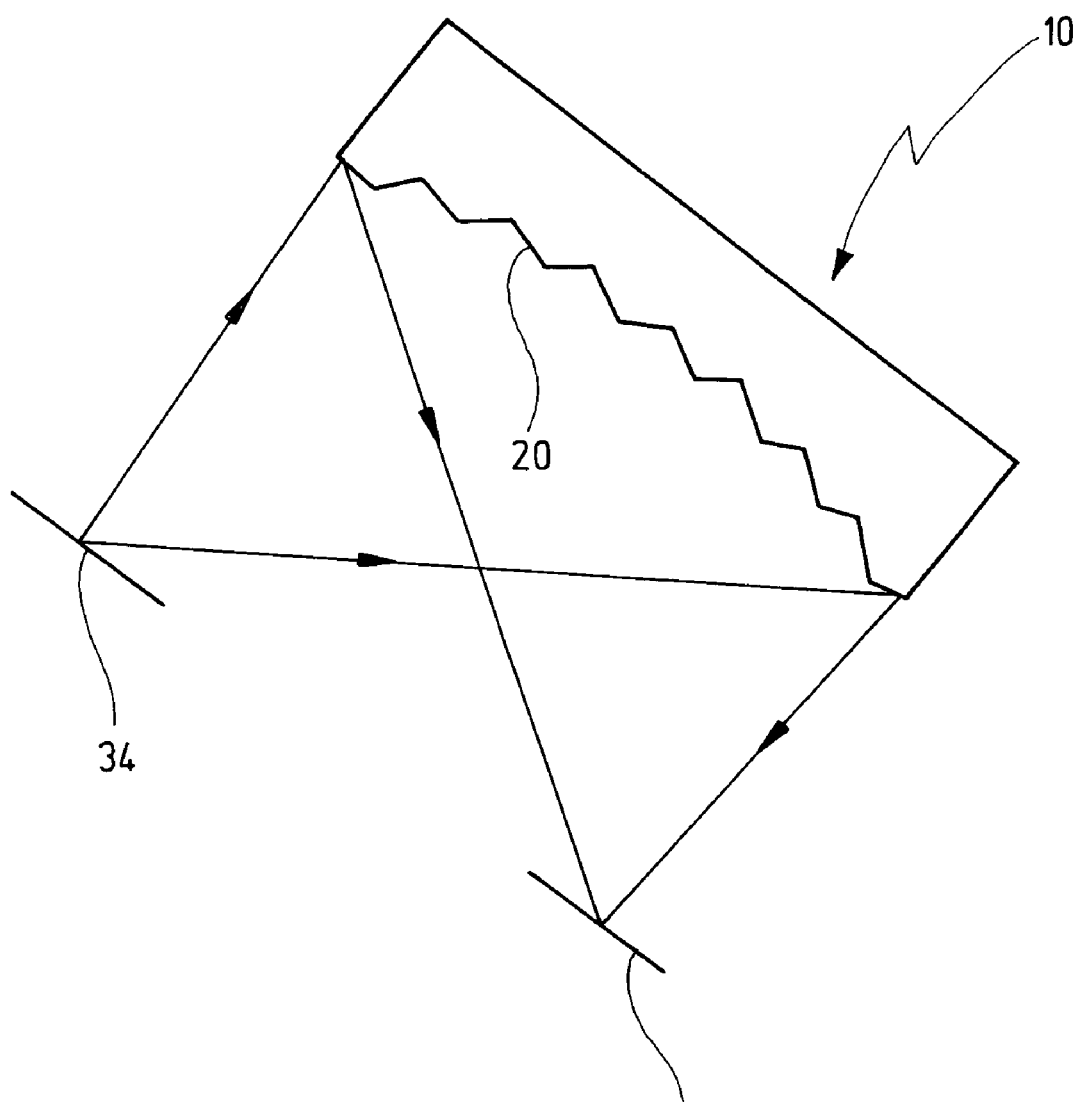
FIG. 1a shows a schematic representation of a spectrometer comprising the blazed grating in FIG. 1.

FIG. 1a shows an example for an application of the blazed grating 10. FIG. 1a shows a spectrometer 30, the blazed grating 10, an entrance slit 34 acting as a light source and a detector 32. In the arrangement shown in FIG. 1a, the blazed grating 10 is mounted such that the incident propagation vector is reflected at the blaze facets. With this configuration the efficiency of the diffraction is maximal.

The spectrometer 30 is preferably such a spectrometer which is operable in the extreme ultraviolet spectral (EUV) range for use in semiconductor lithography equipment. A preferred application of the blazed grating 10 in spectrometer 30 is a use as EUV spectral purity filter.

Another preferred application of the blazed grating 10 is its use in grazing-incidence monochromators for synchrotrone radiation.

Still another preferred application of the blazed grating 10 is its use for spectrometry in the soft x-ray range.

In the following, a method for manufacturing the blazed grating 10 is described, which renders it possible to manufacture the blazed grating 10 with a small and definite blaze angle $\gamma$ while still achieving a high blaze efficiency.

FIGS. 2a through 2d show the principle manufacturing steps of the blazed grating 10 (FIG. 2d)).

Figure 2A:
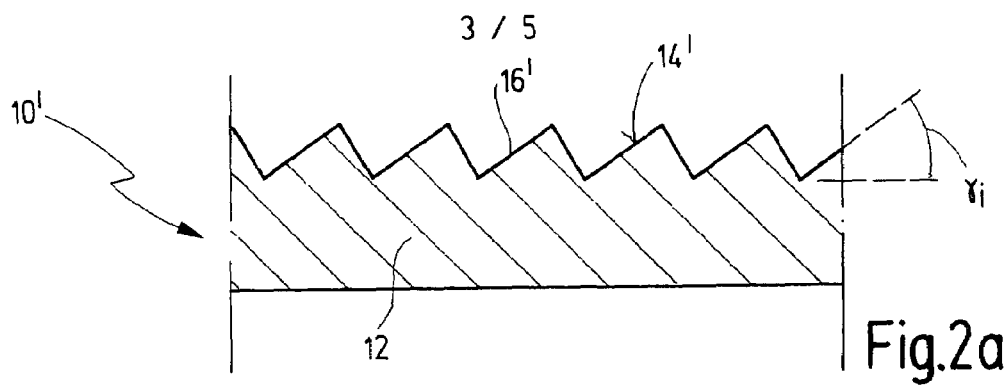
FIGS. 2a–2d show a method for manufacturing the blazed grating in FIG. 1 in general.

According to FIG. 2a), a first substrate 12 is provided, wherein substrate 12 is made of a first material and has a surface 14' which has an initial surface profile 16' having an initial blaze angle $\gamma_i$. Thus, substrate 12 with surface profile 16' represents an initial blazed grating 10' having an initial blaze angle $\gamma_i$ which, however, is not yet as small as desired.

The blazed grating 10' is preferably manufactured by means of mechanical ruling or by means of ion beam blazing of a holographically recorded grating.

Figure 2B:
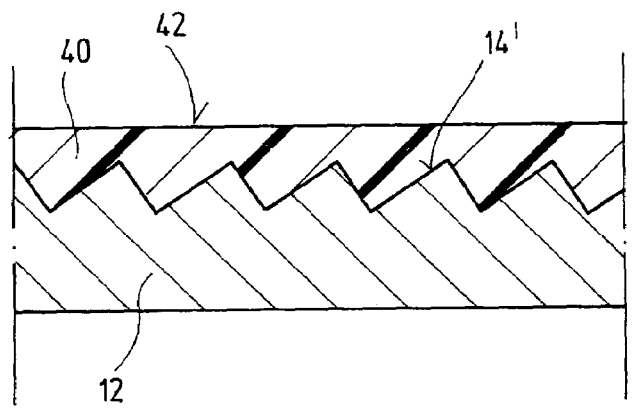

In the next step, as shown in FIG. 2b, an auxiliary layer 40 of a second material is applied onto the surface 14' of the substrate 12, wherein the second material is different from the first material of the substrate 12.

In the case of FIG. 2b, the auxiliary layer 40 has been applied onto the surface 14' of the substrate 12 such that the surface 42 of the auxiliary layer 40 is flat and approximately without a surface profile.

The second material of auxiliary layer preferably is a curable liquid material which is applied onto the surface 14' of substrate 12 in liquid state and then cured, for example thermically cured or cured by means of irradiating it with light. The second material making up the auxiliary layer 40 is preferably chosen from the group comprising a polymer solution, photoresist, epoxy-resin, sol-gel, silicate solution, titanate solution, and other suitable materials.

The second material can be applied by means of one or more deposition processes, in particular by means of spin-on-depositing the second material on the surface 14' of the substrate 12, or by means of dip-coating, wherein the surface 14' is dipped into the second material, for example.

Figure 5:
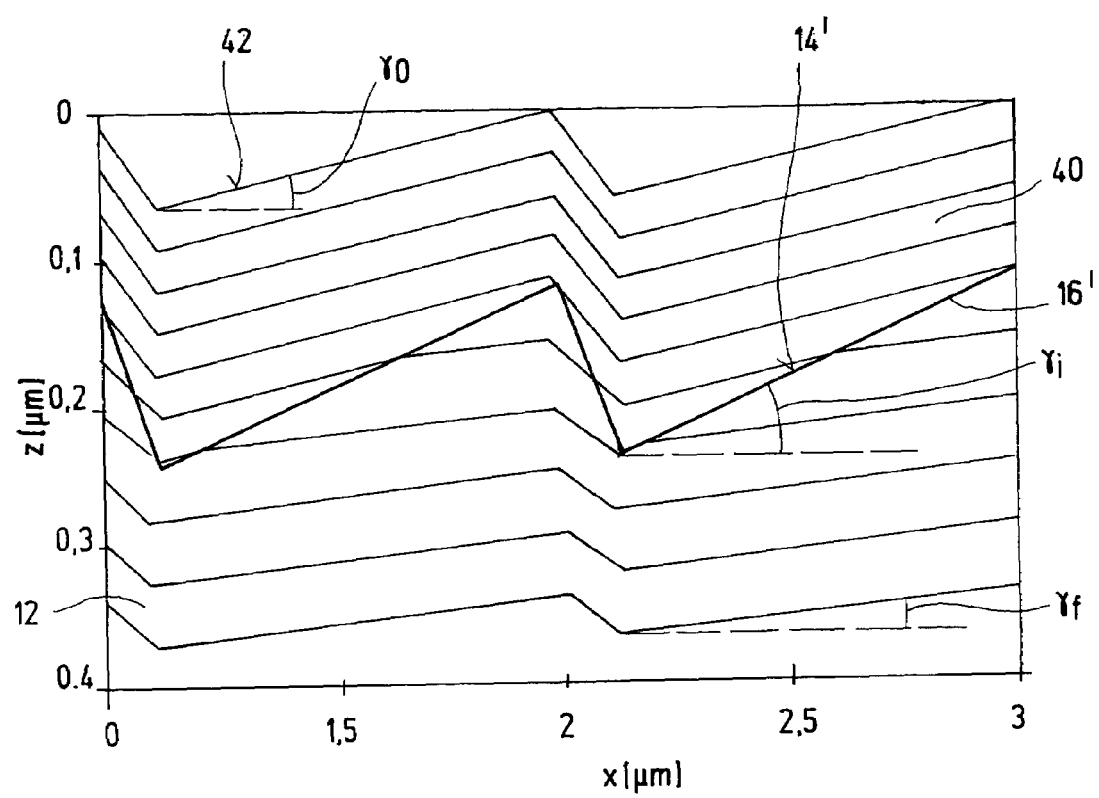
FIG. 5 is a diagram similar to FIG. 3 showing a process simulation of an etching process forming part of a method for manufacturing a blazed grating according to another embodiment, in which the top surface of the auxiliary layer is not flat, but exhibits a blaze profile with a blaze angle smaller than the original blaze angle of the grating.

While surface 42 of auxiliary layer 40 is completely flat in the embodiment shown in FIG. 2b) it can also be envisaged to apply auxiliary layer 40 such that its surface 42 has a surface profile having a blaze angle unequal zero but smaller than the initial blaze angle $\gamma_i$ as it is shown in FIG. 5.

Figure 2C:
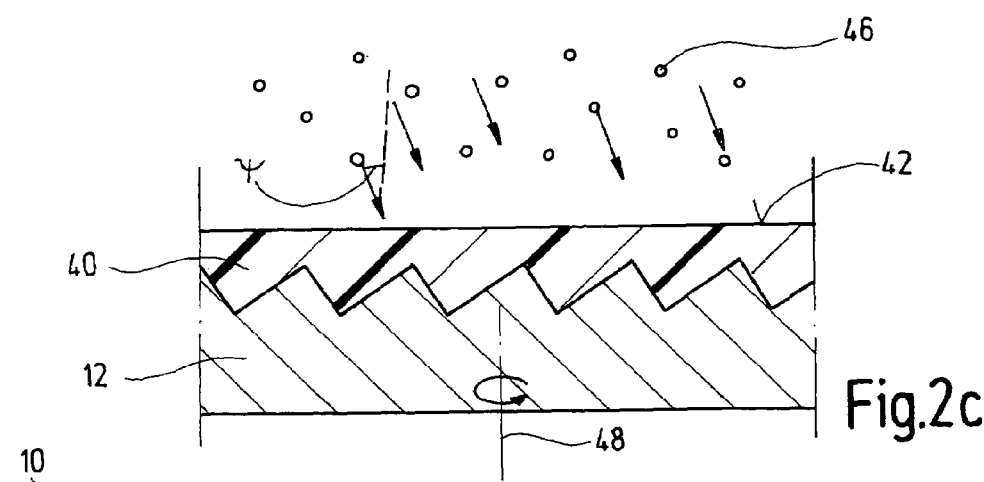
Figure 2D:
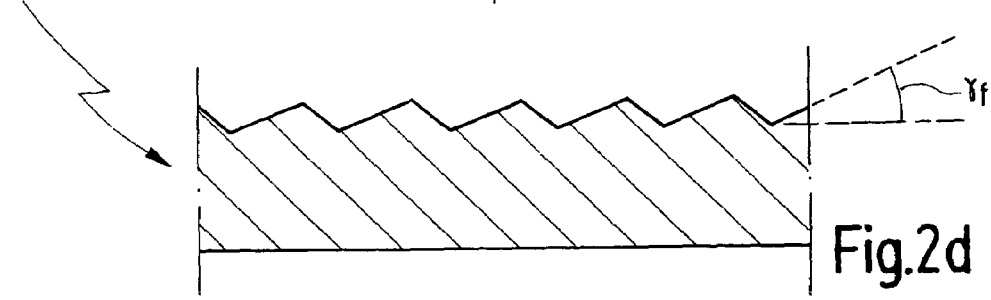

In the next step which is illustrated in FIG. 2c), the auxiliary layer 40 is removed, namely at least partially, preferably completely by means of etching, wherein the etching is carried out at least until the etching simultaneously acts on the auxiliary layer 40 and on the initial surface profile 16' of the substrate 12, as will be described in more detail with reference to FIG. 3.

Figure 3:
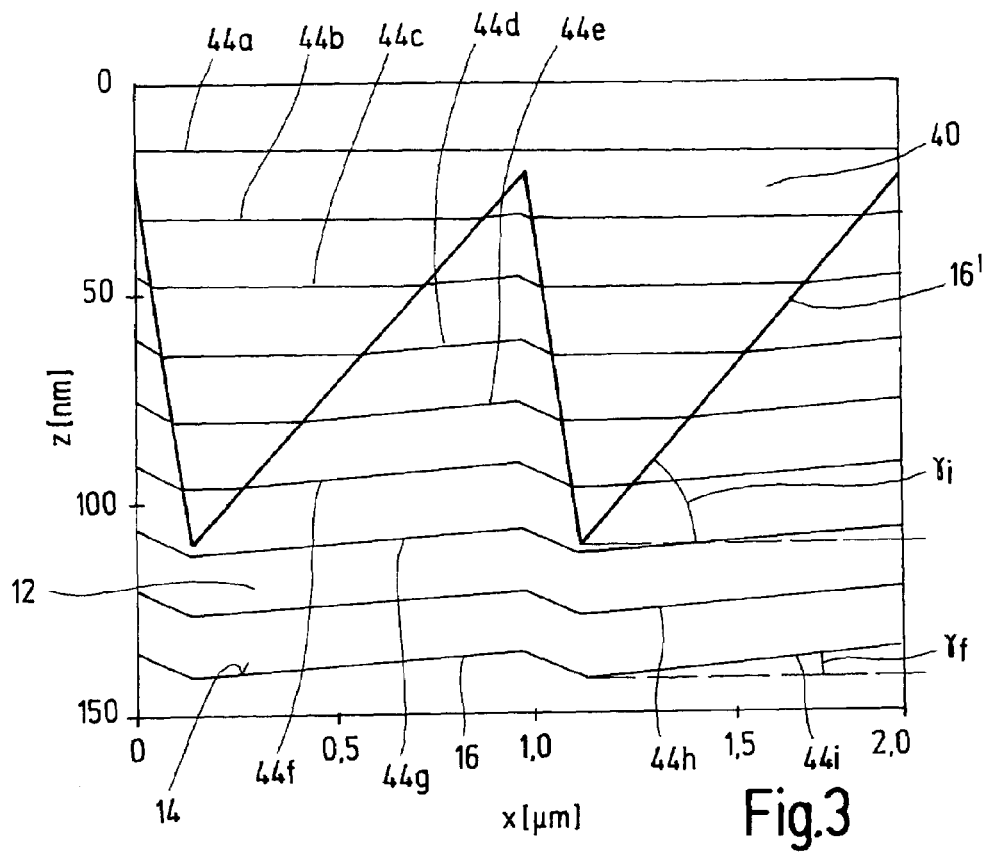
FIG. 3 is a diagram showing a process simulation of an etching process forming part of the method for manufacturing a blazed grating for the case that the etching rate $v_1$ of the auxiliary layer is higher than the etching rate $v_2$ of the substrate.

FIG. 3 shows a process simulation of the etching process. In FIG. 3, the initial surface profile 16' of substrate 12 having the initial blaze angle $\gamma_i$ is represented as well as the auxiliary layer 40.

Lines 44a through 44i illustrate instantaneous surface profiles obtained during the etching (FIGS. 4 through 9 are to be read in a corresponding manner). The z-axis indicates the direction of etching (beginning from 0 to 150 nm in case of FIG. 3). Line 44a represents for example the flat surface 42 of auxiliary layer 40, i.e. at that time the etching does not yet simultaneously act on the auxiliary layer 40 and on the surface profile 16'. Line 44b represents an instantaneous surface profile during the etching when the etching starts approximately simultaneously acting on the auxiliary layer 40 and on the surface profile 16' of the substrate 12.

As can be seen in FIG. 3, the surface profile 16' alters while the etching front represented by lines 44b through 44g passes through the surface profile 16' during etching. After the etching front has completely passed through the surface profile 16' of substrate 12, the initial blaze angle $\gamma_i$ has changed to a final blaze angle $\gamma_f$ (cf. FIG. 2d)).

The alteration of the blaze angle $\gamma$ depends on the ratio between the etching rate $v_1$ for the auxiliary layer 40 and the etching rate $v_2$ for the substrate 12, and this ratio is adjusted such that the initial blaze angle $\gamma_i$ is reduced to the final blaze angle $\gamma_f$, i.e. such that the final blaze angle $\gamma_f$ is smaller than the initial blaze angle $\gamma_i$ of initial surface profile 16' of substrate 12.

The alteration from the initial blaze angle $\gamma_i$ to the final blaze angle $\gamma_f$ is described by $$\frac{\tan\gamma_f}{\tan\gamma_i} = \frac{v_2}{v_1} \cdot \frac{\tan\gamma_0}{\tan\gamma_i} + \left(1 - \frac{v_2}{v_1}\right),$$

wherein $\gamma_f$ is the final blaze angle,
$\gamma_i$ is the initial blaze angle,
$\gamma_0$ is a blaze angle of the surface 42 of the auxiliary layer 40 prior to the etching,
$v_1$ is the etching rate for the auxiliary layer 40,
and $v_2$ is the etching rate for the substrate 12.

The following cases can be discussed with respect to the afore-mentioned equation:

In the case of $v_1=v_2$ the surface profile of surface 42 of auxiliary layer 40 is transferred into the substrate 12 without any modification. This means that in case that $\gamma_0$ is zero as shown in FIG. 2b (i.e. surface 42 is completely flat), then the final blaze angle $\gamma_f$ would be zero in case that $v_1=v_2$.

In case that $v_1>v_2$, the initial blaze angle $\gamma_i$ is altered to a non-zero final blaze angle $\gamma_f$ also in case that the initial surface 42 of auxiliary layer 40 is completely flat, i.e. without any profile (blaze angle $\gamma_0=0$). While in case that $v_1>v_2$ the sign character of final blaze angle $\gamma_f$ is the same as for initial blaze angle $\gamma_i$, the sign character of final blaze angle $\gamma_f$ is inversed with respect to the initial blaze angle $\gamma_i$ when $v_1<v_2$.

In the embodiment shown in FIG. 3, the ratio $v_2/v_1$ was adjusted to 0.93 and the initial blaze angle $\gamma_i$ has been reduced from 6° to the final blaze angle $\gamma_f=0.40°$. In the same manner, the anti-blaze angle has been reduced from 300 to 2.30. This is a further advantageous effect of the invention, namely that the anti-blaze angle can be reduced by approximately the same amount as the blaze angle, which means that the maximum value of the efficiency is maintained, while the blaze wavelength is shifted towards smaller wavelengths.

In the embodiment of FIG. 3, the auxiliary layer 40 consisted of a polymer, and the density of grooves (1/a) was 1000 l/mm (lines per millimeter).

Figure 4:
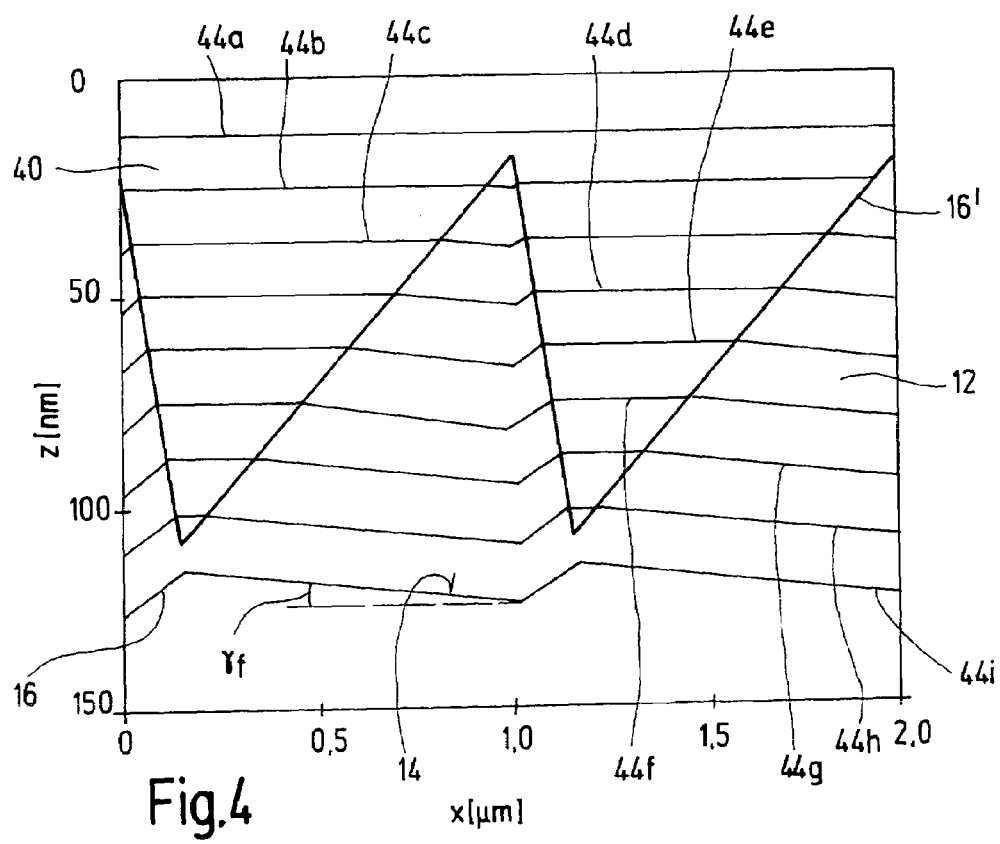
FIG. 4 is a diagram similar to FIG. 3 showing a process simulation of an etching process for the case that the etching rate $v_1$ of the auxiliary layer is smaller than the etching rate $v_2$ of the substrate.

The embodiment of FIG. 4 differs from the embodiment of FIG. 3 in that the ratio $v_2/v_1$ has been adjusted to 1.11 so that the final blaze angle $\gamma_f$ is inverted with respect to the initial blaze angle $\gamma_i$. The final blaze angle $\gamma_f$ is −0.68°, and the final anti-blaze angle is −4.2° (for the same initial values as in FIG. 3).

The ratio between the etching rate $v_1$ for the auxiliary layer 40 and the etching rate $v_2$ for the substrate 12 is preferably adjusted to reduce the initial blaze angle $\gamma_i$ to the final blaze angle $\gamma_f$ by a factor in a range from about 0 to about 20.

The ratio between the etching rate $v_1$ for the auxiliary layer 40 and the etching rate $v_2$ for the substrate 12 is preferably adjusted to values in a range from about 0 to about 10. Further, in order to achieve best results, it can be envisaged to variably adjusting the ratio between $v_1$ and $v_2$ during the etching by controlling etching parameters as will be described later depending on the kind of etching process.

As comes out from FIGS. 3 and 4, the adjustment of the ratio between $v_1$ and $v_2$ can also be used to modify or alter the shape of the single blaze facets from the initial surface profile 16' to the final surface profile 16 of the blazed grating 10 to be manufactured. This effect is particularly useful in the following cases which are described later with reference to FIGS. 6 and 7.

The embodiment shown in FIG. 5 differs from the embodiments shown in FIGS. 3 and 4 in that a significantly thinner auxiliary layer 40 has been applied onto the surface 14 of substrate 12 such that the surface 42 of the auxiliary layer 40 has a surface profile having a blaze angle $\gamma_1$ which is smaller than the initial blaze angle $\gamma_1$ of the substrate 12. This can be achieved by applying the auxiliary layer 40 of the second material onto the substrate 12 in form of a curable liquid material, for example a curable polymer solution as the second material in liquid state onto the substrate 12. In the embodiment of FIG. 5, the auxiliary layer 40 has been removed by ion beam etching wherein the ratio $v_2/v_1$ has been adjusted to 0.66. As a result, the initial blaze angle $\gamma_1$ has been reduced from 8° to 1.9°, wherein the blaze angle $\gamma_1$ has been chosen to be 4°, and the anti-blaze angle has been reduced from 43° to 17°, wherein the anti-blaze angle of surface 42 has been chosen to be 17°.

In the preferred embodiment of the present invention, the etching according to FIG. 2c) comprises at least one etching process chosen from the group comprising ion etching, ion beam etching, reactive ion etching, reactive ion beam etching, and combinations thereof.

However, the etching can also be carried out by means of chemical etching, in particular wet chemical etching.

In case of chemical etching a suitable chemical liquid is used, which is for example an aqueous solution of ammonium fluoride. In general, the chemical liquid is chosen such that the chemical liquid etches the auxiliary layer 40 and the substrate 12 with the desired ratio between the etching rate $v_1$ for the auxiliary layer 40 and the etching rate $v_2$ for the substrate to produce the desired final blaze angle $\gamma_f$. In case of a chemical etching, the auxiliary layer is for example a silicate or titanate, and the substrate 12 is for example made of glass or silica glass. The chemical liquid must be chosen such that the etching rates for the auxiliary layer 40 and the substrate 12 differ from each other. The liquid preferably comprises at least two components, a proportion of mixture of which is preferably adjusted for a fine adjustment of the ratio between the etching rate $v_1$ for the auxiliary layer 40 and the etching rate for the substrate 12.

In case that the etching comprises an etching process chosen from the group comprising ion etching, ion beam etching, reactive ion etching, reactive ion beam etching, which is the more preferred choice of etching processes, the auxiliary layer 40 and the substrate 12 are irradiated by means of ions 46 as illustrated in FIG. 2c). The ions 46 first impinge on the auxiliary layer 40 and in the course of the etching also onto the substrate 12 at an ion incidence angle $\psi$.

The ratio between the etching rate $v_1$ for the auxiliary layer 40 and the etching rate $v_2$ for the substrate 12 can be roughly adjusted by admixing reactive gases to the ion gas in the ion source. While argon gas is used as the ion source, oxygen, for example, can be admixed which increases the etching rate of the organic auxiliary layer 40, and $CF_4$, for example, can be admixed in order to increase the etching rate for the substrate 12, in particular if the substrate 12 is made of a glass or silicon material.

A fine adjustment of the ratio between the etching rate $v_1$ for the auxiliary layer 40 and $v_2$ for the substrate 12 can be achieved by considering the angle $\psi$ dependencies of $v_1$ and $v_2$ and by choosing a suitable ion incidence angle $\psi_0$ at which the ratio of the etching rates $v_2(\psi)/v_1(\psi)$ is such that the reduction of the initial blaze angle $\gamma_i$ to the desired final blaze angle $\gamma_f$ is obtained.

Figure 6:
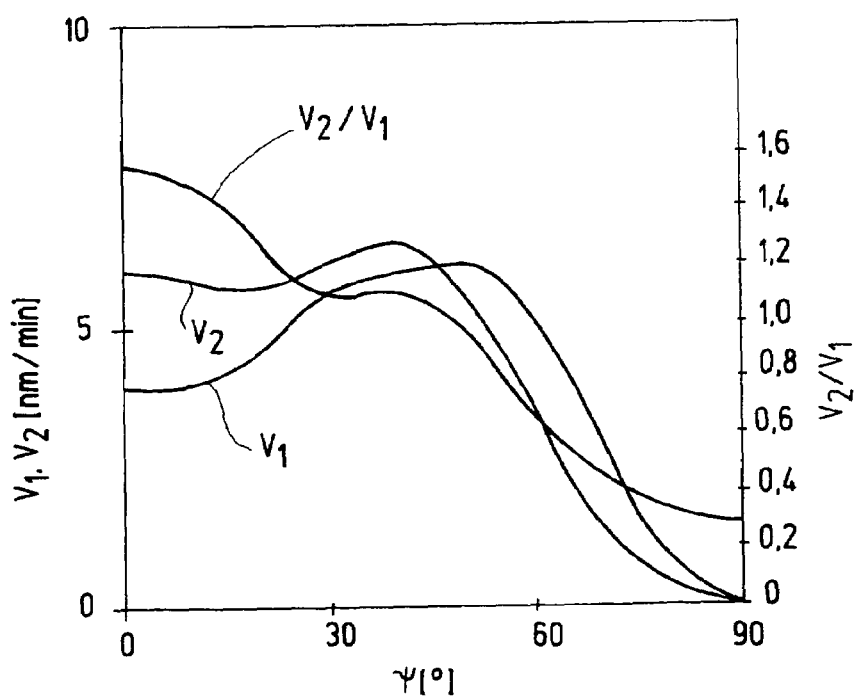
FIG. 6 is a diagram showing the etching rate of ion beam etching of a polymer layer as an auxiliary layer and of a glass substrate as the substrate in dependence on the ion incidence angle $\psi$.

FIG. 6 shows the angle dependencies of $v_1$, $v_2$ and $v_2/v_1$ on the ion incidence angle $\psi$.

In order to achieve a micro roughness of the etched surface 14 of the blazed grating 10 which is as low as possible, it is preferred to rotate the substrate 12 about the grating normal 48 during the ion beam etching, whereby the influence of structural inhomogenities in the auxiliary layer 40 is averaged out by the precession of the ion beam around the normal 48.

Further, it is to be understood that the etching can be carried out in a plurality of subsequent single etching steps, wherein the respective etching process chosen for the single etching step can differ between subsequent etching steps. In this context, it can be envisaged, for example, to carry out an ion beam etching and subsequently a chemical etching.

Further, in case that etching is carried out by means of ions which are directed onto the auxiliary layer and the substrate, the angle $\psi$ of incidence of the ions onto the auxiliary layer and the substrate can be varied during the etching in order to variably adjust the ratio of $v_2/v_1$ for the best result to be achieved. This technique is preferably used for flattening rounded blaze facets of the initial groove profile.

Another possibility to remove curvatures of the initial blaze facets during the etching process is to only initially removing the auxiliary layer by etching, before the etching front has completely run through the surface profile 16' of the substrate 12, then stopping the etching and removing the remaining portion of the auxiliary layer by separating it from the substrate 12.

What is claimed is:

1. A method for manufacturing a blazed grating from a prefabricated initial blazed grating, comprising the steps of:
   providing said initial blazed grating, comprising a substrate of a first material and having a surface which has an initial surface profile, which has a multiplicity of grooves, having an initial blaze angle;
   applying an auxiliary layer of a second material onto said surface of said substrate, said second material being different from said first material;

removing said auxiliary layer at least partially by means of etching, wherein said etching is carried out at least until said etching simultaneously removes said auxiliary layer and said first material of said substrate; and adjusting a ratio between an etching rate for said auxiliary layer and an etching rate for said substrate such that said initial blaze angle is reduced to a final blaze angle.

2. The method of claim 1, wherein said ratio between said etching rate for said auxiliary layer and said etching rate for said substrate is adjusted such that said initial blaze angle is reduced to said final blaze angle by a factor in a range from about 0 to about 20.

3. The method of claim 1, wherein said ratio between said etching rate for said auxiliary layer and said etching rate for said substrate is adjusted to values lower than 1.

4. The method of claim 1, wherein said ratio between said etching rate for said auxiliary layer and said etching rate for said substrate is adjusted to values larger than 1.

5. The method of claim 1, wherein said ratio between said etching rate for said auxiliary layer and said etching rate for said substrate is variably adjusted during said etching.

6. The method of claim 1, wherein said ratio between said etching rate for said auxiliary layer and said etching rate for said substrate is adjusted to values in a range from about 0 to about 10.

7. The method of claim 1, wherein said ratio between said etching rate for said auxiliary layer and said etching rate for said substrate is adjusted such that a shape of a single blaze facet of said initial surface profile is altered.

8. The method of claim 1, wherein said ratio between said etching rate for said auxiliary layer and said etching rate for said substrate is adjusted such that a shape of a single blaze facet of said blazed grating to be manufactured is planar.

9. The method of claim 1, wherein said ratio between said etching rate for said auxiliary layer and said etching rate for said substrate is adjusted according to $$\frac{\tan\gamma_f}{\tan\gamma_i} = \frac{v_2}{v_1} \cdot \frac{\tan\gamma_0}{\tan\gamma_i} + \left(1 - \frac{v_2}{v_1}\right),$$

wherein
$\gamma_f$ is said final blaze angle,
$\gamma_i$ is said initial blaze angle,
$\gamma_0$ is a blaze angle of a surface of said auxiliary layer prior to said etching,
$v_1$ is said etching rate for said auxiliary layer, and
$v_2$ is said etching rate for said substrate.

10. The method of claim 1, wherein said applying said auxiliary layer onto said surface of said substrate comprises applying said auxiliary layer such that a surface of said auxiliary layer has a surface profile with a blaze angle smaller than said initial blaze angle.

11. The method of claim 1, wherein said applying said auxiliary layer onto said surface of said substrate comprises applying said auxiliary layer such that a surface of said auxiliary layer is flat, approximately without having a surface profile.

12. The method of claim 1, wherein said etching comprises at least one etching process chosen from the group comprising ion etching, ion beam etching, reactive ion etching, reactive ion beam etching, chemical etching and combinations thereof.

13. The method of claim 1, wherein said etching comprises a plurality of subsequent single etching steps, wherein each single etching step comprises an etching process chosen from the group comprising ion etching, ion beam etching, reactive ion etching, reactive ion beam etching, chemical etching and combinations thereof.

14. The method of claim 13, wherein said etching process differs amongst different etching steps.

15. The method of claim 1, wherein said removing said auxiliary layer at least partially by means of etching comprises initially removing said auxiliary layer by etching, stopping etching and removing a remaining portion of said auxiliary layer by separating it from said substrate.

16. The method of claim 1, wherein said etching comprises at least chemically etching said auxiliary layer and said substrate by means of a chemical liquid, which is chosen such that said chemical liquid etches said auxiliary layer and said substrate with said ratio between said etching rate for said auxiliary layer and said etching rate for said substrate to produce said final blaze angle.

17. The method of claim 16, wherein said chemical liquid comprises at least two components, a proportion of mixture of said at least two components being adjusted to adjust said ratio between said etching rate for said auxiliary layer and said etching rate for said substrate.

18. The method of claim 1, wherein said etching comprises at least one etching process chosen from the group comprising ion etching, ion beam etching, reactive ion etching, reactive ion beam etching, wherein ions are directed onto said auxiliary layer and said substrate, wherein said ratio between said etching rate for said auxiliary layer and said etching rate for said substrate is adjusted by at least one of the steps of admixing at least one gas to said ions which is reactive to said second material of said auxiliary layer and admixing at least one gas which is reactive to said first material of said substrate.

19. The method of claim 1, wherein said etching comprises at least one etching process chosen from the group comprising ion etching, ion beam etching, reactive ion etching, reactive ion beam etching, wherein ions are directed onto said auxiliary layer and said substrate, and wherein an angle of incidence of said ions onto said auxiliary layer and said substrate is constant during said etching.

20. The method of claim 1, wherein said etching comprises at least one etching process chosen from the group comprising ion etching, ion beam etching, reactive ion etching, reactive ion beam etching, wherein ions are directed onto said auxiliary layer and said substrate, and wherein an angle of incidence of said ions onto said auxiliary layer and said substrate is varied during said etching to adjust said ratio between said etching rate for said auxiliary layer and said etching rate for said substrate.

21. The method of claim 1, wherein said etching comprises at least one etching process chosen from the group comprising ion etching, ion beam etching, reactive ion etching, reactive ion beam etching, wherein ions are directed onto said auxiliary layer and said substrate, and wherein an angle of incidence of said ions onto said auxiliary layer and said substrate is isotropicly distributed around a normal of said surface of said substrate.

22. The method of claim 1, wherein said substrate is rotated around a normal of said surface of said substrate during etching.

23. The method of claim 1, wherein said applying said auxiliary layer of a second material onto said substrate comprises applying a curable liquid material as said second material onto said substrate.

24. The method of claim 23, wherein said curable liquid material is chosen from the group comprising a polymer solution, photo resist, epoxy-resin, sol-gel, silicate solution, titanate solution.

25. The method of claim 1, wherein said applying said auxiliary layer of a second material onto said substrate comprises spin-on depositing said second material on said surface of said substrate.

26. The method of claim 1, wherein said applying said auxiliary layer of a second material onto said substrate comprises applying said second material on said surface of said substrate by means of dip-coating.

27. The method of claim 1, wherein said applying said auxiliary layer of a second material onto said substrate comprises applying a curable liquid material as said second material onto said substrate, pressing a casting die onto said curable liquid material, curing said curable liquid material and separating said casting die from said second material.

28. The method of claim 1, wherein said providing said substrate of said first material comprises providing as said first material a material chosen from the group comprising glass, silica glass, silicon, silicon carbide, calcium fluoride, magnesium fluoride, nickel, gold.

* * * * *